2,899,404

STYRENE-ALLYL ALCOHOL-ACRYLIC ACID TERPOLYMERS, PROCESS OF PREPARING SAME AND COATING COMPOSITION THEREFROM

Earl C. Chapin, Springfield, and Richard F. Smith, Ludlow, Mass., assignors to Monsanto Chemical Company, St. Louis, Mo., a corporation of Delaware No Drawing. Application January 10, 1955
Serial No. 480,997

9 Claims. (Cl. 260—43)

This invention relates to new terpolymer systems. More particularly, the invention relates to terpolymer systems containing alcohol groups and free carboxy groups.

One object of this invention is to provide new terpolymer systems.

A further object is to provide terpolymer systems containing both alcohol groups and free acid groups.

These and other objects are attained by copolymerizing an allyl alcohol component with a styrene component and an unsaturated acid component.

In the following examples which are illustrative of this invention, parts are parts by weight.

Example I

Mix together 35 parts of styrene monomer, 15 parts of allyl alcohol monomer, 5 parts of acrylic acid monomer, 10 parts of xylene and 1.5 parts of ditertiarybutyl peroxide. Heat the mixture in a closed pressure vessel at 200° C. for about 1 hour. The product is a colorless syrup containing the polymer dissolved in unreacted monomer and xylene. Remove the monomer and xylene by vacuum distillation of about 150° C. to obtain a clear, brittle product soluble in acetone, dimethyl formamide and xylene-butanol mixtures. The product contains about 5.5% carboxyl groups by weight and about 5.2% hydroxyl groups by weight.

Example II

Mix together 25 parts of styrene monomer, 25 parts of allyl alcohol monomer, 5 parts of acrylic acid monomer, 10 parts of xylene and 1.5 parts of ditertiarybutyl peroxide. Heat the mixture in a closed vessel at 200° C. for about 1 hour. The product is a clear syrup comprising polymer dissolved in unreacted monomer and xylene. Remove the monomer and xylene by vacuum distillation at about 120° C. to obtain a clear, brittle, solid material soluble in acetone, dimethyl formamide, xylene-butanol mixtures and hot xylene. The polymer contains about 6% carboxyl groups by weight and about 6.5% hydroxyl groups by weight.

Example III

Mix together 15 parts of styrene monomer, 35 parts of allyl alcohol monomer, 5 parts of acrylic acid monomer, 10 parts of xylene and 1.5 parts of ditertiarybutyl peroxide. Heat the mixture in a closed pressure vessel at about 200° C. for about 1 hour. The product is a clear syrupy solution of the polymer in unreacted monomer and xylene. Remove the monomer and xylene by vacuum distillation at about 120° C. to obtain a clear, brittle solid soluble in acetone, dimethyl formamide, xylene-butanol mixtures and hot xylene. The polymer contains about 8.8% by weight of carboxyl groups and 7.9% by weight of hydroxyl groups.

The three components of the system of this invention are allyl or methallyl alcohol, styrene or a ring-substituted styrene and an unsaturated acid. The allyl or methallyl alcohol may constitute from 1 to 40% by weight of the terpolymer, the styrene compound may constitute from 30 to 90% by weight of the terpolymer and the unsaturated acid may constitute from 1 to 50% by weight of the terpolymer. The materials comprising the styrene component are styrene, ring-substituted alkyl styrenes such as ortho, meta, and paramethyl, ethyl, butyl, etc. styrenes, ortho-para or ortho-meta dimethyl or diethyl styrenes, ring-substituted chlorostyrenes such as the mono-, di-, and trichlorostyrenes, and alkyl chlorostyrenes such as ortho methyl para chlorostyrene. Mixtures of two or more of the styrene compounds may be used. The unsaturated acid component comprises such materials as acrylic acid, methacrylic acid, crotonic acid, cinnamic acid, all of which compounds are alpha,beta-ethylenically unsaturated monocarboxylic acids. Mixtures of these acids may be used.

In preparing the terpolymers of this invention, the three types of monomeric components should be mixed together with or without an organic solvent inert to the reactants. The mixture may contain a free radical polymerization initiator. The mixture should be heated in a closed pressure-resistant reaction vessel at from 100 to 250° C. under autogenous pressure. The reaction should be run from 15 to 75 minutes to obtain conversions ranging from 30 to 70% depending on the conditions chosen.

The reaction may be carried out in the presence of a free radical polymerization initiator such as ditertiarybutyl peroxide, benzoyl peroxide, tertiarybutyl perbenzoate, pinacolone peroxide, etc. The amount of initiator may vary between 0.1 and 5 parts per 100 parts of monomer mixture.

The products of the polymerization step are generally syrupy liquids which comprise a solution of the terpolymer in unreacted monomer and solvent if a solvent is used. The terpolymer is easily recovered from the syrup by removing the unreacted monomer and solvent either by vacuum distillation at temperatures up to 200° C. or by other conventional drying techniques. The terpolymers are generally hard, colorless, brittle resins containing from about 1 to about 10% hydroxyl groups by weight and from about 1 to about 15% carboxyl groups by weight.

The products of this invention are particularly useful in coating compositions as the main resin constitutent thereof with relatively minor amounts of other coating resins such as alkyd resins, phenol-, urea- and melamine-formaldehyde condensates, epoxy resins, etc. or the terpolymers may be used in relatively small amounts as modifiers for the other coating resins. Furthermore, the terpolymers may be esterified with drying oil acids to produce resins which will air dry. Among the most valuable coating compositions are the terpolymers of this invention admixed with a minor amount of a methylol melamine ether.

Example IV

Prepare a 50% solids solution of the resins of Example I in a xylene-butanol (1–1) mixture. Prepare a 50% solids solution of a butyl ether of trimethylol melamine in a xylene-butanol (1–1) mixture. Mix 3 parts of the terpolymer solution with 1 part of the melamine resin solution until a homogeneous solution is obtained. Cast this solution on a clean glass plate, dry the cast film for a few minutes, e.g., about 20 minutes, in air at room temperature and then heat the film at 150° C. for about 20 minutes. The cured, hard, clear film is substantially unaffected by such solvents as xylene and by sodium hydroxide solutions.

Various pigments, fillers, dyes and other conventional additives may be added to the solutions such as that of Example IV to yield coating compositions. Other organic solvents may be used as the vehicle, e.g., ketones such as acetone and methyl ethyl ketone, benzene and aliphatic alcohols.

The foregoing description and particularly the examples are illustrative of this invention and it is obvious that many variations may be made within the spirit and scope thereof.

What is claimed is:

1. A terpolymer consisting of an allyl alcohol component, a styrene component and an alpha,beta-ethylenically unsaturated monocarboxylic acid component, the amount of allyl alcohol component in the terpolymer varying between 1 and 40% by weight, the amount of styrene component in the terpolymer varying between 30 and 90% by weight, and the amount of unsaturated acid component in the terpolymer varying between 1 and 50% by weight; said terpolymer having been prepared by the process which comprises mixing the allyl alcohol component, the styrene component and the unsaturated acid component together and heating the resulting mixture to a temperature of 100–250° C. under autogenous pressure for from 15 to 75 minutes; said styrene component being a member of the group consisting of styrene, ring-substituted alkyl styrenes, ring-substituted chlorostyrenes, ring-substituted alkyl chlorostyrenes and mixtures thereof and said allyl alcohol component being a member of the group consisting of allyl and methallyl alcohols and mixtures thereof.

2. A terpolymer as in claim 1 wherein the alcohol is allyl alcohol.

3. A terpolymer as in claim 1 wherein the styrene component is styrene.

4. A terpolymer as in claim 1 wherein the unsaturated acid is acrylic acid.

5. A terpolymer as in claim 1 wherein the alcohol is allyl alcohol, the styrene component is styrene and the unsaturated acid is acrylic acid.

6. A process for preparing a terpolymer consisting of styrene, allyl alcohol and acrylic acid which comprises preparing a mixture of 25–70% by weight of styrene, 25–70% by weight of allyl alcohol and about 10% by weight of acrylic acid and heating the resulting mixture to a temperature of 100–250° C. under autogenous pressure for from 15 to 60 minutes.

7. An interpolymer prepared by the method of claim 6.

8. A coating composition comprising an organic solvent solution of (1) a thermosetting resin taken from the group consisting of phenol-, urea- and melamine-formaldehyde condensation products and (2) a terpolymer of claim 1.

9. A coating composition as in claim 8 wherein the thermosetting resin is a butylated melamine-formaldehyde condensation product.

References Cited in the file of this patent

UNITED STATES PATENTS

| | | |
|---|---|---|
| 2,333,635 | Britton et al. | Nov. 9, 1943 |
| 2,441,515 | Snyder | May 11, 1948 |
| 2,624,722 | Kropa et al. | Jan. 6, 1953 |

FOREIGN PATENTS

| | | |
|---|---|---|
| 883,551 | France | Mar. 29, 1943 |